US008818812B2

United States Patent
Kim

(10) Patent No.: US 8,818,812 B2
(45) Date of Patent: Aug. 26, 2014

(54) TEXT INPUT METHOD WHICH ASSIGNS INITIAL PHONEME, MEDIAL PHONEME, AND FINAL PHONEME TO SHAPE OF WATCH

(76) Inventor: Sungrim Kim, Gyeonggi-do (KR)

( * ) Notice: Subject to any disclaimer, the term of this patent is extended or adjusted under 35 U.S.C. 154(b) by 69 days.

(21) Appl. No.: 13/519,615

(22) PCT Filed: Dec. 28, 2010

(86) PCT No.: PCT/KR2010/009446
§ 371 (c)(1),
(2), (4) Date: Jun. 28, 2012

(87) PCT Pub. No.: WO2011/081419
PCT Pub. Date: Jul. 7, 2011

(65) Prior Publication Data
US 2012/0287136 A1 Nov. 15, 2012

(30) Foreign Application Priority Data
Dec. 30, 2009 (KR) ........................ 10-2009-0133545

(51) Int. Cl.
*G10L 17/00* (2013.01)
(52) U.S. Cl.
USPC ........................................... 704/254
(58) Field of Classification Search
USPC ........................................... 704/254
See application file for complete search history.

(56) References Cited

U.S. PATENT DOCUMENTS

| 5,337,402 | A  | * | 8/1994  | Kitagawa et al. | ............. 345/619 |
| 6,963,332 | B1 | * | 11/2005 | Watanabe        | ..................... 345/161 |
| 7,218,727 | B1 | * | 5/2007  | Kim             | ......................... 379/355.05 |
| 8,459,885 | B2 | * | 6/2013  | Min             | ............................. 400/472 |

FOREIGN PATENT DOCUMENTS

| KR | 10-0291839 B1   | 1/2001  |
| KR | 20-0423637 Y1   | 9/2006  |
| KR | 20-2008-0001719 U | 11/2008 |

* cited by examiner

*Primary Examiner* — Michael N Opsasnick
(74) *Attorney, Agent, or Firm* — Revolution IP, PLLC

(57) ABSTRACT

The present invention relates to a text display method and a text input method. The text display method creates a syllable by combining one or more consonants and vowels based on a combination rule of initial, medial and final phonemes, wherein the initial phonemes are assigned with respective consonants based upon the length and direction of the hour hand, the medial phonemes are assigned with respective vowels based upon the length and direction of the minute hand, and the final phonemes are shaped by the length of the second hand and assigned with consonants similar to the initial phonemes but with a shorter length. As such, not only can people quickly learn how to read and write, they can also input text easily.

7 Claims, 5 Drawing Sheets

FIG. 3

| Basic | First stroke | Second stroke |
|---|---|---|
| ㄱ | ㅋ | ㄲ |
| ㄷ | ㅌ | ㄸ |
| ㅂ | ㅍ | ㅃ |
| ㅈ | ㅊ | ㅉ |
| ㅅ | ㅆ | |
| ㅇ | ㅎ | |
| ㅁ | ㅁ | |
| ㄴ | | |

FIG. 4

| Basic | First stroke | Second stroke | Third stroke |
|---|---|---|---|
| ㅗ | ㅛ | | |
| ㅚ | ㅘ | ㅙ | |
| ㅏ | ㅑ | | |
| ㅣ | ㅐ | ㅒ | ㅒ |
| ㅜ | ㅠ | | |
| ㅟ | ㅝ | ㅞ | |
| ㅓ | ㅕ | | |
| ㅣ | | | |

(a)

(b)

(c)

(d)

(a)

(b)

TEXT INPUT METHOD WHICH ASSIGNS INITIAL PHONEME, MEDIAL PHONEME, AND FINAL PHONEME TO SHAPE OF WATCH

TECHNICAL FIELD

The present invention relates to a text display method, and in particular to a text display method and a text input method which make it possible to easily and fast write or read as well as to easily input a text in such a way that initial, medial and final phonemes are assigned to an hour hand, a minute hand and a second hand of a watch, respectively.

BACKGROUND ART

Korean is one of the most exclusive cultures of Korea, the effectiveness of which is incomparable with other alphabets.

For example, Chinese is an ideogram, so it is needed to memory all alphabets; however Korean and English are phonograms, so it is easy to learn.

Korean is called a morning alphabet since a person can learn in one day. 10 vowels and 14 consonants can be combined, which leads to an easier learning, and about 8,000 phonemes can be created with 24 alphabets. In other words, whatever sounds can be written.

Japanese comes from Chinese, so it cannot be combined without using Chinese, and Chinese is very hard to learn. The Chinese government once sent scholars to the USA to secretly study the alphabets of Chinese because they thought that the illiteracy rate is high since it is hard to learn Chinese, which might result in lowering the nation's competitiveness.

Korean can express everything by speaking and writing in only Korean; however some of the older generation assert that it is needed to use Korean in combination with Chinese or some of professors assert that it is needed to increase the education on Chinese.

The Chinese government even recognizes the weakness of Chinese for the use as a further alphabet in the 21st century, so in such circumference their assertions are not reasonable for the globalization of Korean.

Latin alphabets have been used as an official alphabet in Catholic Church and are being used by a person who does not understand their accurate meanings following the custom or religion authorities; however in the western countries, Latin alphabets are just alphabets which disappear.

Nevertheless to say, it seems that Roman alphabets are also incomplete. There is a little confusion in expressing Roman alphabets in Korea. Part of such confusion lies in that Roman alphabet has too many phonemes which cannot be properly pronounced as compared with the complete Korean, so it is impossible to express what has been expressed in Korean, by using it enough to the extent that everyone can recognize. If Korean is worse than Roman alphabets, there will be no dissatisfaction because the set Roman alphabet does not have any problems.

The Roman alphabet has a weakness in terms of vowels. There are only five vowels: A, E, I, O and U. There are semi-vowels of W and Y for the purpose of supplementing them. The alphabets "ㅓ, ㅕ, ㅡ, ㅢ" which can be easily expressed in Korean cannot be originally expressed, and "ㅐ, ㅒ, ㅖ" cannot be also expressed.

Even expert cannot recognize the syllables of Roman alphabets. In case of Korean, even non-expert can recognize them. In other words, a person who simply understands Korean might be similar with a person who can best understand Roman alphabets. Korean has the advantages coming from both phonemic writing and syllabic writing.

They say the 21st century is an information society, which means that the quantities and qualities of accurate information are subject to the competitiveness of a nation. The elimination of illiteracy might lead to an information society.

Someone asserts that it is needed to educate a people, who use their own language without their alphabets, not Korean, with Korean alphabets as phonetic alphabets.

Since other languages have different phonetic systems as compared with Korean, it is needed to develop a certain reference format which differs from a Korean spelling even when someone expresses their own languages in Korean alphabets as long as they have not a phonetic system similar with that of Korean by accident.

Korean is formed of a group writing system based on which Korean there is provided a CVC syllable structure formed of initial+medial+final phonemes, so Korean is very weak in expressing a consonant group (in case of str in English word "strike") which is not expressed in a separate form and a diphthong. Neglecting such matters, all consonants should be reluctantly expressed in a surplus form of a vowel "ㅡ" and "ㅇ" having a voiceless sound in terms of all consonants. In case of a separate writing system, a spatial formation characteristic of a vowel alphabet and a consonant alphabet are different from each others, so in case of a simple arrangement, there is a significant resistance in terms of a visual effect, so some of alphabets are inevitably subject to deformation.

When a deformation occurs in the shape of a certain alphabet, it might be an alphabet which is not familiar with most of Korean, so such deformed alphabet would be a new alphabet based on Korean or a Korean-stemmed alphabet.

What a specific language uses a certain alphabet is directly related with a politics and a religion. What a few rare languages used in the old Soviet Russian Union were changed from their Cyrillic alphabet to Roman alphabet after the collapse of Russia is made for the reasons of politics (hostility against the rule of Russia), and what the languages belonged to Islamic cultures were expressed in Arabic alphabets are due to the cultural and religious reasons. In other words, the use of the alphabets is related with the culture and identity, so an attempt to introduce the above mentioned system for the reason of its efficiency was failed.

Most of the rare languages might have a reference format which is different from the known facts, and most of them are based on the alphabets or Roman alphabets that the occupying languages of their countries are using. As such, it is known that the Roman alphabets are the alphabets which are most widely used in the world and are based on the European; however it seems that it has a certain neutrality which actually does not represent a specific country or a specific people's culture. The Roman alphabets are widely used in expressing many languages with the advantages that it is simple in printing and processing with a computer. Above all, most of the people who are trying to preserve rare languages are the users of the Roman alphabets.

They however discharge their mother languages and come to use the Roman alphabets as their occupying languages because they think that using their occupying languages is more beneficial than to use their mother languages, and such is directly linked to their survivals in society. In other words, it might be meant that the use of standard languages is more beneficial than to use the standard languages rather than to use or preserve the dialects. The preservation of rare languages is largely dependent on the external environments such as politics, economy and cultural dependency. In the above-mentioned views, it is hard for Korean, which is an exclusive preservation of Korean people, to be recognized as the alphabet of a rare language which does not have a close relationship with Korean people in terms of politics and religion for the scientific reasons in a state that political influences, economical supports, academic researches and humanitarian supports are not provided.

DISCLOSURE OF INVENTION

Accordingly, the present invention is made to resolve the above-mentioned problems, and it is an object of the present invention to provide a text display method and a text input method using the same which make possible for everyone to easily learn and write and which make it possible to express the pronunciations of all kinds of languages throughout the world and to express the sounds of nature.

To achieve the above objects, there is provided a text input method which assigns an initial phoneme, a medial phoneme and a final phoneme to the shape of a watch, which comprises an initial phoneme in which each consonant is assigned depending on the length and direction of a hour hand; a medial phoneme in which each vowel is assigned depending on the length and direction of a minute hand; and a final phoneme in which the length of a second hand is formed in a certain shape, and each consonant is assigned in the same way as the initial phoneme, with the length of it being shortest, so syllables are created in accordance with a combination principle of the initial phoneme, the media phoneme and the final phoneme based on at least one consonant and vowel.

In terms of the initial phoneme and the media phoneme, a fortis and a plosive sound are displayed by adding a stroke to a basic consonant group consisting of eight consonants of "ㄱ, ㄴ, ㄷ, ㅁ, ㅂ, ㅅ, ㅇ, ㅈ", and in terms of the media phoneme, a diphthong is displayed by adding a stroke to a basic vowel group consisting of eight vowels of "ㅗ, ㅕ, ㅏ, ㅔ, ㅜ, ㅝ, ㅓ, ㅣ", and in terms of the basic consonant group and the basic vowel group, the basic consonant group consisting of eight consonants of "ㄱ, ㄴ, ㄷ, ㅁ, ㅂ, ㅅ, ㅇ, ㅈ" and the basic vowel group consisting of eight vowels of "ㅗ, ㅑ, ㅏ, ㅔ, ㅜ, ㅝ, ㅓ, ㅣ" are assigned with reference to 12 o'clock, 1.5 o'clock, 3 o'clock, 4.5 o'clock, 6 o'clock, 7.5 o'clock, 9 o'clock and 10.9 o'clock, respectively, which represent the hour hand the minute hand of a watch, and the basic consonant group is displayed with the length of the hour hand of the watch, and the basic vowel group is displayed with the length of the minute of the watch for the purpose of separations, and they are set as the initial phoneme and the media phoneme, respectively, and there is further provided a stroke for adding one by one a stroke to the basic consonant group and the basic vowel group, and the thusly assigned basic consonant group is assigned as a final phoneme in such a way that the length of it is shorter than those of the initial phoneme and the final phoneme.

In details, in terms of the basic consonant group, they are assigned to 12 o'clock, 1.5 o'clock, 3 o'clock, 4.5 o'clock, 6 o'clock, 7.5 o'clock, 9 o'clock, 10.5 o'clock of the hour hand, respectively, in a sequence of "ㄴ, ㄱ, ㅂ, ㅈ, ㅇ, ㅅ, ㅁ, ㄷ" and are displayed as much as the length of the hour hand in a radial direction from the center of the watch, and in terms of the basic vowel group, they are assigned to 12 o'clock, 1.5 o'clock, 3 o'clock, 4.5 o'clock, 6 o'clock, 7.5 o'clock, 9 o'clock, 10.5 o'clock, respectively, in a sequence of "ㅗ, ㅑ, ㅏ, ㅔ, ㅜ, ㅝ, ㅓ, ㅣ" and are displayed as much as the length of the minute hand in a radial direction from the center of the watch.

In terms of the stroke, the plosive sounds of "ㅋ", "ㅌ", "ㅍ", "ㅊ" are obtained by adding a first stroke to the initial and final phoneme displays of "ㄱ", "ㄷ", "ㅂ", "ㅈ", and the fortis of "ㄲ", "ㄸ", "ㅃ", "ㅉ" are obtained by further adding a second stroke, and "ㅆ", "ㅎ", "ㄹ" are obtained by adding a first stroke to the initial and final phoneme displays of "ㅅ", "ㅇ", "ㅁ", respectively, and in terms of the media phoneme, and with one first stroke, it is possible to express "ㅛ" from "ㅗ", "ㅖ" from "ㅔ", "ㅑ" from "ㅏ", "ㅒ" from "ㅐ", "ㅠ" from "ㅜ", "ㅝ" from "ㅝ", "ㅕ" from "ㅓ", "ㅕ" from "ㅣ", and with a second stroke, it is possible to express "ㅖ" from "ㅔ", "ㅙ" from "ㅘ", "ㅞ" from "ㅝ", and with a third stroke, it is possible to express "ㅒ" from "ㅔ", respectively.

In addition, an upright alphabet can be formed in such a way to make the direction recognizable by attaching the final phoneme to an end portion of the medial phoneme, and a line-shaped alphabet can be formed by straight writing each syllable.

The text display method, which is directed to assigning the initial, medial and final phonemes to the shapes of a watch can create syllables by combining at least one consonant and vowel in a combining principle of initial, media and final phonemes in such a way to include an initial phoneme which assigns each consonant depending on the length and direction of the hour hand, a medial phoneme which assigns each vowel depending on the length and the direction of the minute hand, and a final phoneme which is determined depending on the direction that the initial phoneme approaches the medial phoneme.

The initial phoneme is directed to expressing a fortis and a plosive sound by adding a stroke to a basic consonant group consisting of eight consonants of "ㄱ, ㄴ, ㄷ, ㅁ, ㅂ, ㅅ, ㅇ, ㅈ", and the middle phoneme is directed to expressing a diphthong by adding a stroke to a basic vowel group consisting of eight vowels of "ㅗ, ㅑ, ㅏ, ㅔ, ㅜ, ㅝ, ㅓ, ㅣ", and the final phoneme is directed to being expressed by arranging at the upper, lower, left and right sides of the initial phoneme to the basic vowel group. The above mentioned basic consonant group is directed to assigning to 12 o'clock, 1.5 o'clock, 3 o'clock, 4.5 o'clock, 6 o'clock, 7.5 o'clock, 9 o'clock and 10.5 o'clock in a sequence of "ㄴ, ㄱ, ㅂ, ㅈ, ㅇ, ㅅ, ㅁ, ㄷ", and is expressed as much as the length of the hour hand in a radial shape from the center of the watch, and the above mentioned basic vowel group is directed to assigning to 12 o'clock, 1.5 o'clock, 3 o'clock, 4.5 o'clock, 6 o'clock, 7.5 o'clock, 9 o'clock, and 10.5 o'clock in a sequence of "ㅗ, ㅑ, ㅏ, ㅔ, ㅜ, ㅝ, ㅓ, ㅣ" as it is expressed as much as the length of the minute hand in a radial shape from the center of the watch, and "ㅏ/ㅓ", "ㅗ/ㅜ", "ㅘ/ㅝ" and "ㅣ/ㅔ" are connected for thus forming in a straight line shape, and the final phoneme is expressed in such a way that the above assigned basic consonant group is sequentially assigned on the horizontal straight line in the basic vowel group of the horizontal straight line which connected "ㅏ/ㅓ", and the final phoneme arranged in the vowel group of "ㅏ/ㅓ" is rotated 45° in the clockwise direction, thus arranging the final phoneme to the vowel group of "ㅣ/ㅔ", and the final phoneme is arranged in the vowel group of "ㅗ/ㅜ" by rotating 90°, and the final phoneme is arranged in the vowel group of "ㅘ/ㅝ" by rotating −45°.

In addition, it is possible to express with the grouped alphabet consisting of a first section which expresses a modifier such as adjective or adverb, a second section which expresses an uninflected word or an ending word and a third section which expresses a noun or a pronoun.

In addition, in the text display method which is directed to assigning an initial phoneme, a medial phoneme and a final phoneme to the shape of a watch, respectively, it is possible to create syllables by combing at least one consonant and vowel with an initial phoneme, a medial phoneme and a final phoneme in such a way to include an initial phoneme and a medial phoneme which assign each consonant depending on the length and direction of the hour hand and a final phoneme which assigns each vowel depending on the length and direction of the minute hand.

It is preferred that the initial phoneme and the final phoneme are directed to expressing consonants or fortis by adding a stroke to the basic consonant group consisting of eight consonants of "n, g, b, z, ng, s, m, d", and the medial phoneme is directed to expressing a basic vowel group (vowels or semi-vowels) consisting of eight vowels of "o, wa, a, e, u, wuo, ue, I", and the basic consonant group and the basic vowel group are directed to assigning the basic consonant group consisting of eight consonants of "n g, b, z, ng, s, m, d) and the basic vowel group consisting of eight vowels of "o, wa, a, e, u, wuo, ue, I" based on 12 o'clock, 1.5 o'clock, 3 o'clock, 4.5 o'clock, 6 o'clock, 7.5 o'clock, 9 o'clock and 10.5 o'clock, respectively, and the basic consonant group is expressed with the length of the hour hand of the watch, and the basic vowel group is expressed with the length of the minute hand of the watch, which are set as the initial phoneme and the medial phoneme, respectively, and a stroke is included so as to add one by one a stroke to the basic consonant group, and the above-mentioned stroke is expressed with a length shorter than that of the basic consonant group or the basic vowel group.

The stroke can be expressed with "v, k, p, c, h, x, l, t" by adding a first stroke in the initial and final phonemes of "n, g, b, z, ng, s, m, d", and the fortis of "f, gg, bb, zz, q, r, dd" can be expressed by adding a second stroke in the initial and final phoneme displays of "n, g, b, z, ng, m, d", and "yo, we, ya, ae, yu, wy, ui" can be expressed by adding a first stroke in the phoneme expression of the medial phoneme of "o, wa, a, e, u, wuo, I", and "wae, ye, wye" can be expressed by adding a second stroke in the basic medial expression of "wa, e, wuo", and the phoneme of "yae" can be expressed by adding a third stroke in the basic medial expression of "e".

Advantageous Effects

According to the text display method according to the present invention, the initial phoneme, the medial phoneme and the final phoneme can be expressed by arranging to the hour hand, the minute hand and the second hand of a watch, respectively, which results in the reduction of strokes of an alphabet, and it is possible to write syllables in a linked form or to express in a grouped form, so it is possible to quickly and easily write alphabets as well as to understand them.

The text display method according to the present invention is directed to a syllable alphabet which can be written by grouping initial, medial and final phonemes, and is directed to a syllable alphabet in which each of the initial, medial and final phonemes has an inherent phoneme value. It has a characteristic that a phoneme value can be further arranged by adding a stroke to each of the initial, medial and final phoneme alphabets. So, eight alphabets can be added to the eight initial phonemes, and eight alphabets can be added to the eight medial phonemes, and eight alphabets can be added to the eight final phonemes, so the text display method according to the present invention can express 64*64*64*=262,144 sounds of nature, which is an amazing sound expression ability. The above mentioned sound expression ability can be made possibly only by the text display method according to the present invention, which method is for the first time in the world. The text display method of the present invention is directed to an original technology which can be implemented by using the sound symbols of all the countries. As another original technology, only four shapes of the alphabets are needed in expressing 262,144 sounds of nature along with the excellent alphabet recognition performance. The four shapes of the alphabets are a hour hand shape, a minute hand shape, a second hand shape, and an adding stroke. Since only the four alphabets are used, everyone can easily study and learn in one hour, which produces a creative effect.

BRIEF DESCRIPTION OF DRAWINGS

FIG. 3 is a view explaining a method for displaying a fortis and plosive sound depending on a stroke of eight basic initial phonemes.

FIG. 4 is a view explaining a method for displaying a diphthong depending on eight basic vowels.

MODES FOR CARRYING OUT THE INVENTION

The terms and words used in the specification and claims are not limitedly interpreted in a conventional way or a dictionary way, but shall be interpreted as a meaning and concept most matching with a technical concept of the present invention in compliance with the principle that an inventor can define the concept of the terms for him to explain his invention in the best way.

The terms in the specification and claims are meant as follows.

"Yuno alphabet" represents all the alphabets used in the present invention, in particular, it means a grouped alphabet.

"Haegul" represents an alphabet which is a key of Yuno alphabet and is an alphabet which is formed based on the watch and is named because the watch is made based on the sun.

"Prose" represents a prose because it looks like a long straight line when words are written connected without separations. When writing the prose, the principle of "Haegul writing" is adapted.

The text input method according to the present invention will be described with reference to the accompanying drawings.

First of all, the input method of Haegul will be described with reference to FIGS. 1 to 6. The Haegul is expressed by separating it into an initial phoneme, a medial phoneme and a final phoneme, and the initial phoneme has eight basic alphabets depending on the shape of the length of a hour hand of the watch, and a stroke is added to the eight basic alphabets of the initial phoneme, thus creating 11 alphabets.

Figure 1:
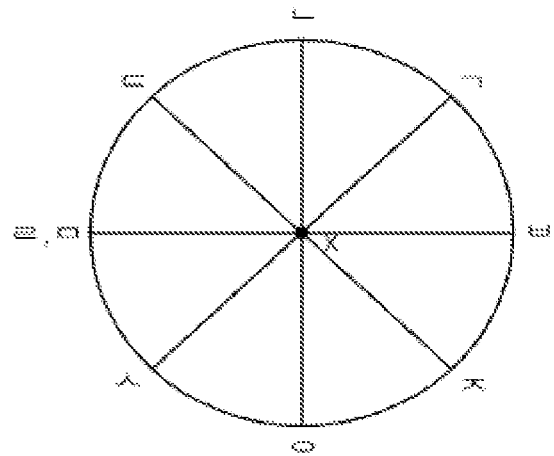
FIG. 1 is a view explaining an arrangement of an initial phoneme of a Haegul.

FIG. 1 is a reference view for explaining an arrangement of an initial phoneme of Haegul. As shown therein, the basic consonant group consisting of eight consonants of "ㄱ, ㄴ, ㄷ, ㅁ, ㅂ, ㅅ, ㅇ, ㅈ" is assigned to based on 12 o'clock, 1.5 o'clock, 3 o'clock, 4.5 o'clock, 6 o'clock, 7.5 o'clock, 9 o'clock, 10.5 o'clock, respectively, which represent the hour hands of the watch.

The present invention will be described, as an example of the method for arranging the basic consonant group, in such a way that they are assigned to 12 o'clock, 1.5 o'clock, 3 o'clock, 4.5 o'clock, 6 o'clock, 7.5 o'clock, 9 o'clock, 10.5 o'clock, respectively, in a sequence of "ㄴ, ㄱ, ㅂ, ㅈ, ㅇ, ㅅ, ㅁ, ㄷ".

Each syllable is displayed as much as the length of the hour hand in a radial shape in a set direction from the center of the watch based on the starting point "X" which is the center of the watch.

Figure 5:
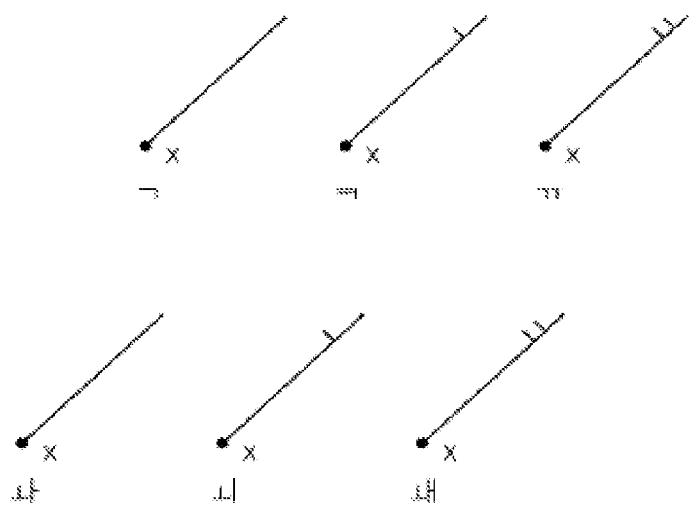
FIG. 5 is a view explaining a method for displaying a stroke in a basic consonant and a basic vowel.

For example, as shown in FIGS. 1 and 5 which show the method for inputting the strokes in the basic consonants and the basic vowels. Since "ㄱ" is in the direction of 1.5 o'clock, it is displayed by drawing a diagonal line in the direction of 1.5 o'clock of the hour hand starting from the reference point "X" is shown in FIG. 5.

Each initial phoneme of Haegul can be displayed as in Table 1 in the above mentioned way.

TABLE 1

| ㄴ | ㄱ | ㅂ | ㅈ | ㅇ | ㅅ | ㅁ | ㄷ |
| --- | --- | --- | --- | --- | --- | --- | --- |
| ǀ | ╱ | ─ | ╲ | ǀ | ╱ | ─ | ╲ |

Eight basic consonants are assigned in the above mentioned way, and the fortis and plosive sound are displayed by adding a stroke to the basic consonant group as shown in Table 1.

As shown in FIG. 3 which explains the method for displaying the plosive sound and the fortis depending on the strokes of the eight basic initial phonemes of FIG. 3, "ㅋ" is obtained by adding one stroke to the basic sound "ㄱ", and "ㄲ" is obtained by further adding the stroke.

In other words, the plosive sounds of "ㅋ", "ㅌ", "ㅍ", "ㅊ" are obtained by adding a first stroke to the initial phoneme display of "ㄱ", "ㄷ", "ㅂ", "ㅈ", and the fortis of "ㄲ", "ㄸ", "ㅃ", "ㅉ" are obtained by further adding a second stroke, and "ㅆ", "ㅎ", "ㄹ" are obtained by adding a first stroke to the initial phoneme display of "ㅅ", "ㅇ", "ㅁ", respectively, so that 19 consonants of initial phonemes are obtained.

In the present invention, the methods that the plosive sound is expressed with a first stroke and the fortis is expressed with a second stroke have been descried, but the changes of the plosive sound and the fortis can be displayed by changing their sequences.

The display method of the plosive sound and the fortis is shown in FIG. 5. In other words, it is preferred to add the stroke at the point where the initial phoneme ends as shown in the drawings. In details, "ㅋ" is obtained by adding one stroke to "ㄱ", and "ㄲ" can be obtained by further adding the stroke.

The method for displaying a medial phoneme will be described as follows.

Figure 2:
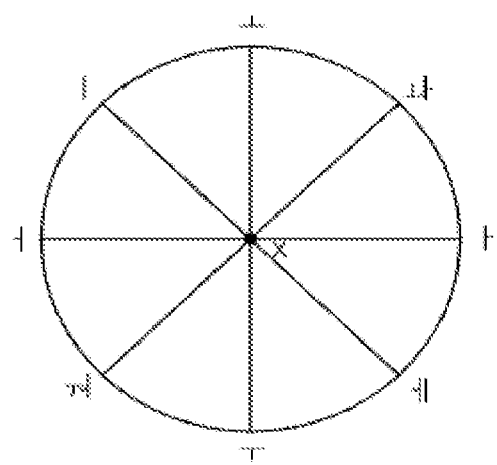
FIG. 2 is a view explaining an arrangement of a medial phoneme of Haegul.

FIG. 2 is a reference view for explaining an arrangement of the medial phoneme of Haegul. The basic vowel group consisting of eight vowels of "ㅗ, ㅘ, ㅏ, ㅔ, ㅜ, ㅟ, ㅓ, ㅣ" is assigned based on 12 o'clock, 1.5 o'clock, 3 o'clock, 4.5 o'clock, 6 o'clock, 7.5 o'clock, 9 o'clock, 10.5 o'clock, respectively, which represent the minute hands of the watch.

In the present invention, as an example of the method for arranging the basic vowel group, it will be described that they are assigned to 12 o'clock, 1.5 o'clock, 3 o'clock, 4.5 o'clock, 6 o'clock, 7.5 o'clock, 9 o'clock, 10.5 o'clock of the hour hands, respectively, in a sequence of "ㅗ, ㅘ, ㅏ, ㅔ, ㅜ, ㅟ, ㅓ, ㅣ".

Each syllable can be displayed as much as the length of the minute hand in a radial shape in a set direction from the center of the watch based on the starting point "X" which is the center of the watch.

For example, as shown in FIGS. 2 and 5, since "ㅘ" corresponds to 1.5 o'clock, it can be displayed by drawing a diagonal line in the direction of 1.5 o'clock starting from the reference point "X" as shown in the lower, left side in FIG. 5.

In the same way as the initial phoneme, eight basic vowels are assigned to the shape of the minute hand of the watch, respectively, and a stroke is added, thus displaying a diphthong.

In other words, referring to the reference drawing which explains the method for displaying by the diphthong depending on the strokes of the eight basic vowels of FIG. 4, in the medial phoneme, with one first stroke, it is possible to express "ㅛ" from "ㅗ", "ㅚ" from "ㅘ", "ㅑ" from "ㅏ", "ㅒ" from "ㅔ", "ㅠ" from "ㅜ", "ㅢ" from "ㅟ", "ㅕ" from "ㅓ", "ㅡ" from "ㅣ", and with a second stroke, it is possible to express "ㅖ" from "ㅔ", "ㅙ" from "ㅘ", "ㅞ" from "ㅟ", and with a third stroke, it is possible to express "ㅐ" from "ㅔ", thus totally expressing 20 vowels in the vowel group.

The vowel "ㅡ" among the vowels can be pronounced by naturally adding "ㅡ" below the consonant of the initial phoneme without a sound display; however a diagonal line is added as much as a length smaller than the length of the initial phoneme at the end portion (corresponding to the point X) of the initial sound so as to enhance the recognition of the alphabet.

For example, since the display method of "ㄱ" is "╱", in case of "ㄱ", when the short "ㅡ" is added to "╱" which is the initial phoneme at the starting point, "ㄱ" becomes " ".

In the display of the diphthong, it was described that with a first stroke, it is possible to express "ㅚ" from "ㅘ", "ㅒ" from "ㅔ", and with a second stroke, "ㅖ" from "ㅔ", and with a third stroke, "ㅐ" from "ㅔ", and "ㅞ" from "ㅘ"; however according to the characteristics of the pronunciation, it is possible to express in such a way that the Korean "ㅚ" represents "ㅞ", "ㅙ" and "ㅔ" represents "ㅐ", and "ㅔ" represents "ㅐ". The adaption of each alphabet is determined depending on context.

The display method of the final phoneme is same as that of the initial phoneme.

In other words, they are assigned to 12 o'clock, 1.5 o'clock, 3 o'clock, 4.5 o'clock, 6 o'clock, 7.5 o'clock, 9 o'clock, 10.5 o'clock of the hour hand, respectively, in a sequence of "ㄴ, ㄱ, ㅂ, ㅈ, ㅇ, ㅅ, ㅁ, ㄷ", and the display of each syllable is expressed as much as the length in a radial shape from the center of the watch based on the starting point X which is the center of the watch.

In addition, in the same way as the initial phoneme, the fortis and plosive sound are displayed depending on the strokes of the eight basic initial phonemes.

The displays of the initial, medial and final phonemes are created based on the principle of the watch, and they are expressed in such a way that the initial phoneme corresponds to the length of the hour hand, the medial phoneme corresponds to the length of the minute hand, and the final phoneme corresponds to a point shorter than the initial phoneme and the medial phoneme, respectively.

In details, the initial phoneme corresponds to the length of the hour hand, it is expressed with a length shorter than the medial phoneme corresponding to the minute hand, and the final phoneme is expressed with a length further shorter than the initial phoneme.

In addition, the number of the strokes of each of the initial, medial and final phonemes might be 8.

The method for displaying syllables in combination by combining at least one consonant and vowel depending on the combining principle of the initial, medial and final phonemes with reference to the accompanying drawings will be described.

Figure 6:
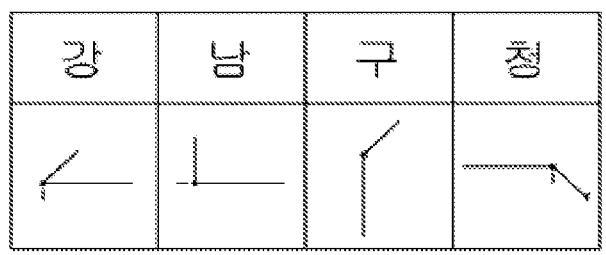
FIG. 6 is a view explaining a method for displaying a syllable by combining depending on a combining principle of an initial phoneme, a medial phoneme and a final phoneme with at least one consonant and vowel.
Figure 6:
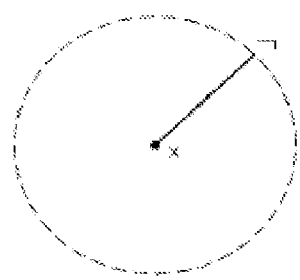
Figure 6:
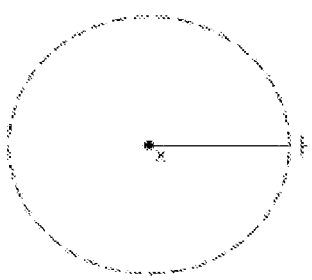
Figure 6:
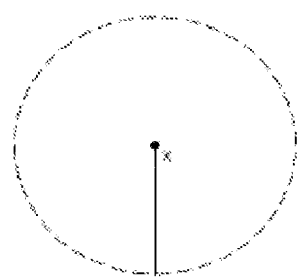
Figure 6:
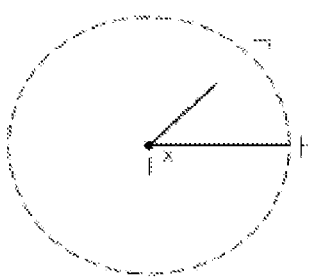

FIG. 6 is a view explaining the method for displaying syllables in combination by combining at least one consonant and vowel depending on the combining principle of the initial, medial and final phonemes. The method of displaying the syllables is as follows by actually adapting the word "강남구청".

In terms of "강" in the word "강남구청", since the initial phoneme is "ㄱ", the initial phoneme with the position "ㄱ" as shown in (a) of FIG. 5 is expressed, and since the medial phoneme is "ㅏ", the medial phoneme with the position "ㅏ" as shown in (b) is expressed, and since the final phoneme is "ㅇ", the final phoneme with "ㅇ" is searched as shown in (c), and the medial phoneme is expressed with the longest length same as the length of the minute hand based on the starting point X as shown in (d), and the initial phoneme is expressed with a length corresponding to the hour hand which is shorter than that of the medial phoneme, and the final phoneme is expressed in the above mentioned direction with the shortest length.

In addition, the final phoneme is not written attached to the starting point X, but is written in a separated shape.

When "남", "구", "청" are expressed in the above mentioned ways, the word "강남구청" can be expressed with each syllable as shown in FIG. 6.

At this time, in case of the word "청", "ㅊ" can be expressed by adding a stroke to "ㅈ" which is one of the basic consonants, it is needed to add a stroke as shown in the drawings.

The above-mentioned syllables can be displayed in a form of a prose by continuously writing without separations.

For example, in case of "강남구청", the end portions of each syllable are connected and displayed.

Figure 7:
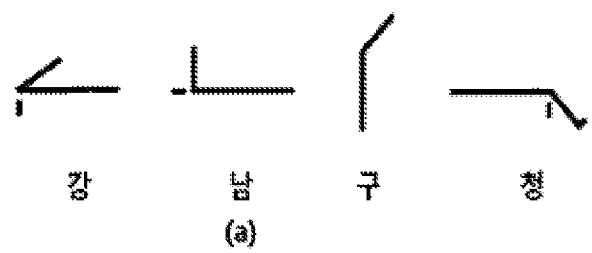
FIG. 7 is a view illustrating an example of a prose formed as Haegul is straight written in a horizontal direction without separations.
Figure 7:
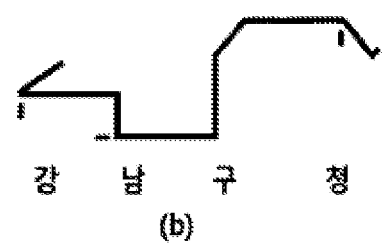

When changing the words "강남구청" expressed in the Haegul form to the prose form, the word becomes like as shown in FIG. 7.

FIG. 7 is a view illustrating an example of the prose that Haegul is continuously written in a horizontal direction without separations. Since the word can be expressed by connecting the joints of each syllable, it is possible to continuously complete up to the last alphabet from when one stroke has started, so the syllables can be much faster expressed reducing the spaces.

The alphabets can be connected by freely connecting the directions of the next alphabets.

FIG. 7 shows a continuous writing without separations in a horizontal direction, but it is obvious that a continuous writing can be possible in a vertical direction.

Figure 8:
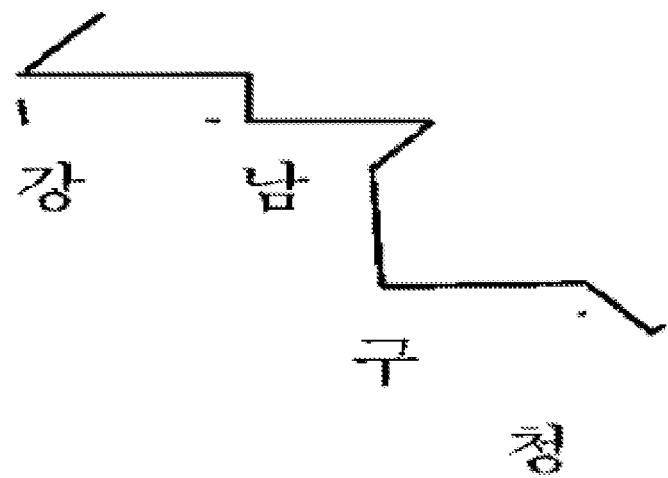
FIG. 8 is a view illustrating an example of a prose formed as Haegul is straight written in a vertical direction without separations.

FIG. 8 is a view illustrating the word "강남구청" which is continuously written in a vertical direction without separations by referring to the drawing showing an example that Haegul is continuously written without separations in a vertical direction.

In Yuno alphabets, the numbers can be expressed in the way shown in Table 2.

In other words, eight numbers are expressed by assigning in a sequence from the 12 o'clock direction in the initial phoneme of FIG. 1, and "9" and "10(0)" is separately expressed as follows.

TABLE 2

| Arabic numbers | 1 | 2 | 3 | 4 | 5 | 6 | 7 | 8 | 9 | 10(0) |
|---|---|---|---|---|---|---|---|---|---|---|
| Yuno numbers | ｜ | ╱ | ─ | ╲ | • | ╱ | ─ | ╲ | " | • |

The preferred embodiments of the present invention has been described based on the structure of the watch for convenience; however eight lines crossing the center of eight trigrams from the book of Changes might be given sound values with reference to the eight trigrams from the book of Changes in the same principle, and as such, alphabets are created or a circular might be divided into eight parts each of which is given a certain sound value in the same principle as the above mentioned principle.

In addition, it is obvious that the present invention is directed to easily inputting alphabets based on the text display method.

In other words, the shapes of the keyboard of the text input device are arranged to match with the shape of the watch of the present invention. When a corresponding text is inputted, Haegul or the grouped alphabet can be directly displayed on the display device or a certain Korean or Roman alphabet corresponding to the inputted sound value can be displayed.

The above mentioned text input method uses the same principles as the above mentioned text display method, so the detailed descriptions thereof will be omitted.

As described above, the detailed embodiments of the present invention has been described; however it is obvious that various amendments and modification within the scope of the present invention can be possibly by an ordinary person skilled in the art, and such amendments and modification belong to the following claims.

INDUSTRIAL APPLICABILITY

As the text display and the text input method according to the present invention are applied to the device which can input or display the texts, it is possible to easily and fast write or read texts and easily input, thus obtaining an easier and fast communication.

The invention claimed is:

1. A text input method in an hour hand, a minute hand and a second hand of a watch, comprising:
   assigning a consonant of an initial phoneme depending on a length and direction of the hour hand;
   assigning a vowel of a medial phoneme depending on the length and direction of the minute hand; and
   forming a final phoneme depending on the length of the second hand,
   wherein the consonant is assigned in the same way as the initial phoneme, with the length of the final phoneme being shortest, so syllables are created in accordance with a combination principle of the initial phoneme, the media phoneme and the final phoneme based on at least one consonant and vowel, wherein, in said initial phoneme and said final phoneme, a fortis and a plosive sound are displayed by adding a stroke to a basic consonant group consisting of eight consonants of "ㄱ, ㄴ, ㄷ, ㅁ, ㅂ, ㅅ, ㅇ, and ㅈ" and in said media phoneme, a diphthong is displayed by adding a stroke to a basic vowel group consisting of eight vowels of "ㅗ, ㅚ, ㅏ, ㅔ, ㅜ, ㅟ, ㅓ, and ㅣ".

2. The text input method according to claim 1, wherein, in said basic consonant group and said basic vowel group, the basic consonant group is consisting of eight consonants of "ㄱ, ㄴ, ㄷ, ㅁ, ㅂ, ㅅ, ㅇ, and ㅈ" and the basic vowel group is consisting of eight vowels of "ㅗ, ㅚ, ㅏ, ㅔ, ㅜ, ㅟ, ㅓ, and ㅣ" are assigned with reference to 12 o'clock, 1.5 o'clock, 3 o'clock, 4.5 o'clock, 6 o'clock, 7.5 o'clock, 9 o'clock and 10.5 o'clock, respectively, which represent the hour hand and the minute hand of a watch, wherein said basic consonant group is displayed with the length of the hour hand of the watch, and the basic vowel group is displayed with the length of the minute of the watch for the purpose of separations, which are set as the initial phoneme and the media phoneme, respectively, and wherein a stroke is provided for adding one by one to the basic consonant group and the basic vowel group, and the thusly assigned basic consonant group is assigned as the final phoneme in such a way that the length of is shorter than the initial phoneme and the final phoneme.

3. A The text input method according to claim 2, wherein said basic consonant group are assigned to 12 o'clock, 1.5 o'clock, 3 o'clock, 4.5 o'clock, 6 o'clock, 7.5 o'clock, 9 o'clock, and 10.5 o'clock of the hour hand, respectively, in a sequence of "ㄴ, ㄱ, ㅂ, ㅈ, ㅇ, ㅅ, ㅁ, and ㄷ" and are displayed as the length of the hour hand in a radial direction from the center of the watch, and wherein said basic vowel group, they are assigned to 12 o'clock, 1.5 o'clock, 3 o'clock, 4.5 o'clock, 6 o'clock, 7.5 o'clock, 9 o'clock, and 10.5 o'clock, respectively, in a sequence of "ㅗ, ㅚ, ㅏ, ㅔ, ㅜ, ㅟ, ㅓ, and ㅣ" and are displayed as the length of the minute hand in the radial direction from the center of the watch.

4. The text input method according to claim 3, wherein, in said stroke, the plosive sounds of "ㅋ", "ㅌ", "ㅍ", "ㅊ" are obtained by adding a first stroke to the initial and final phoneme displays of "ㄱ", "ㄷ", "ㅂ", 0 "ㅈ" and the fortis of "ㄲ", "ㄸ", "ㅃ", "ㅉ" are obtained by further adding a second stroke, and "ㅍ", "ㅎ", "ㄹ" are obtained by adding a first stroke to the initial and final phoneme displays of "ㅅ", "ㅇ", "ㅁ", respectively, and wherein, said media phoneme with one first stroke expresses "ㅛ" from "ㅗ", "ㅙ" from "ㅚ", "ㅑ" from "ㅏ", "ㅡ" from "ㅔ", "ㅠ" from "ㅜ", "ㅞ" from "ㅟ", "ㅕ" from "ㅓ", "ㅢ" from "ㅣ", said media phoneme with a second stroke expresses "ㅖ" from "ㅔ", "ㅚ" from "ㅚ", "ㅞ" from "ㅟ", and said media phoneme with a third stroke expresses "ㅒ" from "ㅔ", respectively.

5. A grouped alphabet input method in an hour hand, a minute hand and a second hand of a watch, comprising:
assigning a consonant of an initial phoneme depending on a length and direction of the hour hand;
assigning a vowel of a medial phoneme depending on the length and direction of the minute hand; and
forming a final phoneme depending on the length of the second hand,
wherein the consonant is assigned in the same way as the initial phoneme, with the length of the final phoneme being shortest, so syllables are created in accordance with a combination principle of the initial phoneme, the media phoneme and the final phoneme based on at least one consonant and vowel,
wherein, in said initial phoneme and said medial phoneme, the initial phoneme and the final phoneme are directed to expressing consonants or fortis by adding a stroke to the basic consonant group consisting of eight consonants of "n, g, b, z, ng, s, m, and d", and the medial phoneme is directed to expressing a basic vowel group consisting of eight vowels of "o, wa, a, e, u, wuo, ue, and i".

6. The grouped alphabet input method according to claim 5,
wherein, in said basic consonant group and said basic vowel group, the basic consonant group is consisting of eight consonants of "n g, b, z, ng, s, m, and d" and the basic vowel group is consisting of eight vowels of "o, wa, a, e, u, wuo, ue, i" based on 12 o'clock, 1.5 o'clock, 3 o'clock, 4.5 o'clock, 6 o'clock, 7.5 o'clock, 9 o'clock and 10.5 o'clock, respectively,
wherein the basic consonant group is expressed with the length of the hour hand of the watch, and the basic vowel group is expressed with the length of the minute hand of the watch, which are set as the initial phoneme and the medial phoneme, respectively, and
wherein the stroke is included one by one to the basic consonant group, and expressed with the length shorter than that of the basic consonant group or the basic vowel group.

7. The grouped alphabet input method according to claim 6, wherein in said stroke, "v, k, p, c, h, x, 1, t" are obtained by adding a first stroke to the initial and final phoneme displays of "n, g, b, z, ng, s, m, d" and the fortis of "f, gg, bb, zz, q, r, dd" being expressed by adding a second stroke in the initial and final phoneme displays of "n, g, b, z, ng, m, d", and "yo, we, ya, ae, yu, wy, ui" being expressed by adding a first stroke in the phoneme expression of the medial phoneme of "o, wa, a, e, u, wuo, i", and "wae, ye, wye" being expressed by adding a second stroke in the basic medial expression of "wa, e, wuo", and the phoneme of "yae" being expressed by adding a third stroke in the basic medial expression of "e".

\* \* \* \* \*